United States Patent
Kim et al.

(10) Patent No.: US 6,859,588 B2
(45) Date of Patent: Feb. 22, 2005

(54) OPTICAL FIBER BLOCK

(75) Inventors: Hyun-Ki Kim, Suwon-shi (KR);
Moon-Koog Song, Suwon-shi (KR);
Jae-Wan Kim, Taegu-Kwangyokshi (KR); Jong-Youl Kim, Kumi-shi (KR)

(73) Assignee: Samsung Electronics Co., Ltd., Suwon-Si (KR)

(*) Notice: Subject to any disclaimer, the term of this patent is extended or adjusted under 35 U.S.C. 154(b) by 245 days.

(21) Appl. No.: 10/074,528

(22) Filed: Feb. 12, 2002

(65) Prior Publication Data
US 2003/0128931 A1 Jul. 10, 2003

(30) Foreign Application Priority Data
Jan. 4, 2002 (KR) .......................................... 2002-415

(51) Int. Cl.⁷ ................................................ G02B 6/30
(52) U.S. Cl. .......................................... 385/49; 385/65
(58) Field of Search .............................. 385/49, 114, 65

(56) References Cited
U.S. PATENT DOCUMENTS

| | | | | |
|---|---|---|---|---|
| 5,257,334 A | * | 10/1993 | Takahashi | .................... 385/65 |
| 5,482,585 A | * | 1/1996 | Ota et al. | ..................... 156/158 |
| 5,602,951 A | * | 2/1997 | Shiota et al. | .................. 385/81 |
| 5,656,120 A | * | 8/1997 | Ota et al. | ..................... 156/293 |
| 5,896,479 A | * | 4/1999 | Vladic | ........................... 385/59 |
| 6,027,253 A | * | 2/2000 | Ota et al. | ...................... 385/83 |
| 6,045,270 A | * | 4/2000 | Weiss et al. | ................... 385/59 |
| 6,132,105 A | * | 10/2000 | Konda et al. | ................. 385/65 |
| 6,160,947 A | * | 12/2000 | Osugi et al. | ................. 385/137 |
| 6,240,235 B1 | * | 5/2001 | Uno et al. | ................... 385/137 |
| 6,424,785 B1 | * | 7/2002 | Melchior | ..................... 385/139 |
| 6,474,877 B1 | * | 11/2002 | Shahid | ........................ 385/65 |

* cited by examiner

Primary Examiner—Ellen E. Kim
(74) Attorney, Agent, or Firm—Cha & Reiter, L.L.C.

(57) ABSTRACT

This invention provides an optical fiber block that includes an optical-fiber-alignment portion and a stress-reduction-depth portion. In the optical-fiber-alignment portion, a V groove array is arranged to accommodate the non-coated fiber portion of a ribbon fiber. The V groove array is formed by primary and secondary wet-etching processes on a silicon wafer, and further includes first V grooves at both sides and second V grooves different from the first V grooves disposed between the first V grooves. Meanwhile, the stress-reduction-depth portion is formed by another wet etching, extending to a predetermined depth from the optical-fiber-alignment portion, for reducing stress caused by a variation in the coating thickness of the optical fibers.

4 Claims, 9 Drawing Sheets

OPTICAL FIBER BLOCK

CLAIM OF PRIORITY

This application makes reference to and claims all benefits accruing under 35 U.S.C. Section 119 from an application entitled "Optical Fiber Block," filed in the Korean Industrial Property Office on Jan. 4, 2002 and there duly assigned Serial No. 2002-415.

BACKGROUND OF THE INVENTION

1. Field of the Invention

The present invention relates generally to an optical fiber block for connecting a Planar Lightwave Circuit (PLC) to an optical fiber and, in particular, to an optical fiber block for coupling a ribbon fiber.

2. Description of the Related Art

A PLC is an optical device in the form of a chip, which is widely used for division, modulation, switching, and multiplexing of optical signals. To connect a pLC to an optical fiber in alignment, an optical block is typically used. The optical fiber block is made of silicon materials and fabricated by wet-etching techniques.

FIG. 1 illustrates a conventional PLC 10 used to connect the input of an optical block 12 and the output of optical fiber blocks 14. As shown in FIG. 1, the optical fiber blocks 12 and 14 connect the PLC 10 to a single fiber F1 and a ribbon fiber F2, respectively. A plurality of N wavelengths are inputted to the input port of the pLC 10 via the single fiber F1, then outputted to the ribbon fiber F2 through the pLC 10. The optical fiber blocks 12 and 14 are provided to fix the fibers F1 and F2 in alignment using an adhesive B, such as epoxy resin. Glass covers G1 and G2 are glued to the input and output sides of the PLC 10, and glass covers G3 and G4 are glued to hold the optical fiber blocks 12 and 14.

The alignment of the ribbon fiber F2 using the optical fiber block 14 and the glass cover G4 is further illustrated in FIG. 2. After the optical fiber block 14 is combined with the glass cover G4, both are polished at a predetermined angle θ with respect to a vertical line L1. The resulting polished surface 16 acts to reduce optical loss.

FIG. 3 illustrates the optical fiber block 14 in which a four-core ribbon fiber is to be placed. As shown in FIG. 3, the optical fiber block 14 is divided into an optical-fiber-alignment portion 140 in which a portion of the optical fibers with its coating removed are aligned thereon, and a stress-reduction-depth portion 142 to reduce the stress caused by the coating thickness of the ribbon fiber. A plurality of V grooves 14a is arranged in the optical-fiber-alignment portion 140. The stress-reduction-depth portion 142 is formed with high precision through the wet-etching techniques.

FIG. 4 shows a perspective view of the optical fiber block 14. As shown in FIG. 4, the optical fiber block 14 serves to fix the uncoated portion of the optical fibers BF that are aligned in the V grooves 14a with equal pitches between them. Thus, it is essential to fabricate the V grooves 14a with high precision, and the placement of the glass cover G4 must be accurate. In addition, the alignment of the optical fibers BF must remain fixed using an adhesive B, such as epoxy resin.

However, the conventional optical fiber block generates the following problems in connecting a PLC to an optical fiber. A silicon wafer, from which the conventional optical fiber block is formed, exhibits specific etch characteristics according to the mask design due to its crystalline structure. This makes it impossible to form V-grooves with a 127-μm pitch. As a result, optical fibers may slip from the V grooves. In addition, as the optical fiber block is combined with a glass cover with a large space interposed between them, a large amount of epoxy is unnecessarily used. The extra epoxy may be contracted and expanded during the change in heat, thereby causing misalignment between an optical fiber array and the glass cover. Furthermore, the contraction and expansion of the epoxy is followed by its de-lamination, causing optical loss in the optical fiber component.

SUMMARY OF THE INVENTION

The present invention overcomes the above-described problems, and provides additional advantages by providing a highly reliable optical fiber block in which the influence of epoxy resin is minimized.

It is another aspect of the invention to provide an optical fiber block having V grooves in which bare optical fibers can be easily placed.

It is a further aspect of the present invention to provide an optical fiber block having a plurality of V grooves in which both ends of the V grooves are easily adapted to place the optical fibers therein.

The foregoing and other advantages of the present invention are achieved by providing an optical fiber block, which includes an optical-fiber-alignment portion and a stress-reduction-depth portion. In the optical-fiber-alignment portion, a V groove array is arranged to accommodate the bare optical fibers of a ribbon fiber. The V groove array is formed by primary and secondary wet etching on a silicon wafer, and contains first V grooves at both sides and second V grooves different from the first V grooves between the first V grooves. The stress-reduction-depth portion is formed by the primary wet etching extended to a predetermined depth from the optical-fiber-alignment portion, for reducing stress caused by a variation in the coating thickness.

BRIEF DESCRIPTION OF THE DRAWINGS

The above and other features and advantages of the present invention will become more apparent from the following detailed description when taken in conjunction with the accompanying drawings in which.

DETAILED DESCRIPTION OF THE PREFERRED EMBODIMENT

In the following description, for purposes of explanation rather than limitation, specific details are set forth such as the particular architecture, interfaces, techniques, etc., in order to provide a thorough understanding of the present invention. However, it will be apparent to those skilled in the art that the present invention may be practiced in other embodiments, which depart from these specific details. For purposes of simplicity and clarity, detailed descriptions of well-known devices, circuits, and methods are omitted so as not to obscure the description of the present invention with unnecessary detail.

To help understand the invention, an optical fiber block is an optical device that connects a PLC to an optical fiber in alignment. The optical fiber is placed in the optical fiber block, covered with a glass cover, and then fixed in alignment. The optical fiber block is aligned with a PLC and then fixed using an adhesive such as epoxy resin. This is a general way in which an optical fiber block is combined with a PLC. A Wavelength-Division Multiplexing (WDM) communication system uses a ribbon fiber as an output optical fiber for performing wavelength multiplexing. The output optical fiber may be a 4-core, 8-core, 16-core, or more than a 16-core fiber depending on the number of channels desired.

Figure 1:
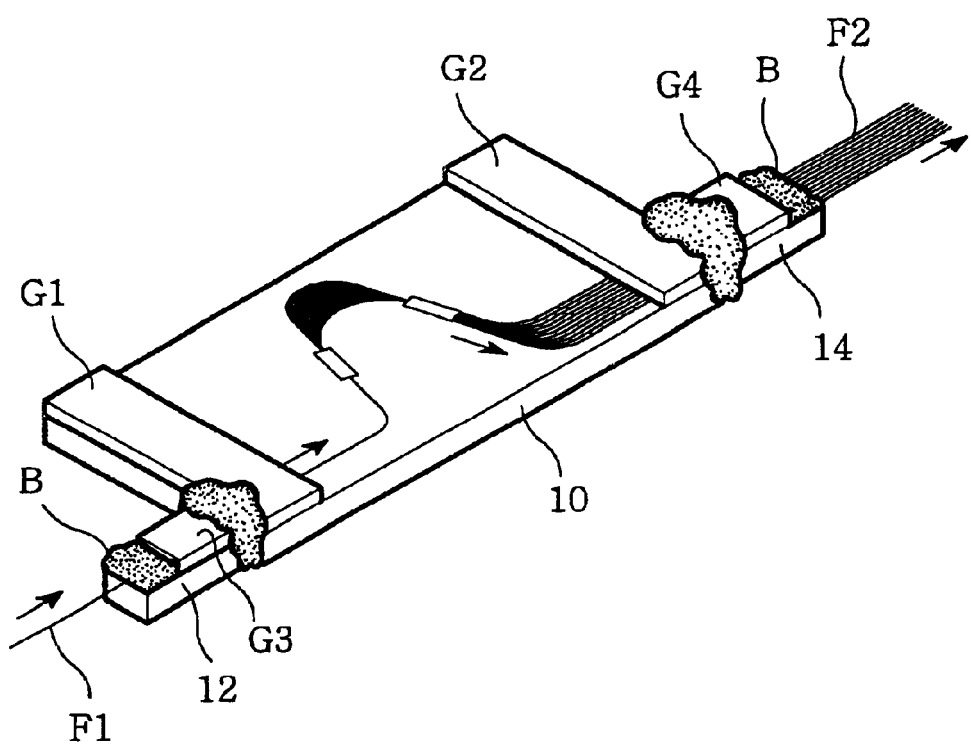
FIG. 1 is a perspective view of a PLC connected to input and output optical fibers according to the conventional input and output optical fiber blocks.
Figure 2:
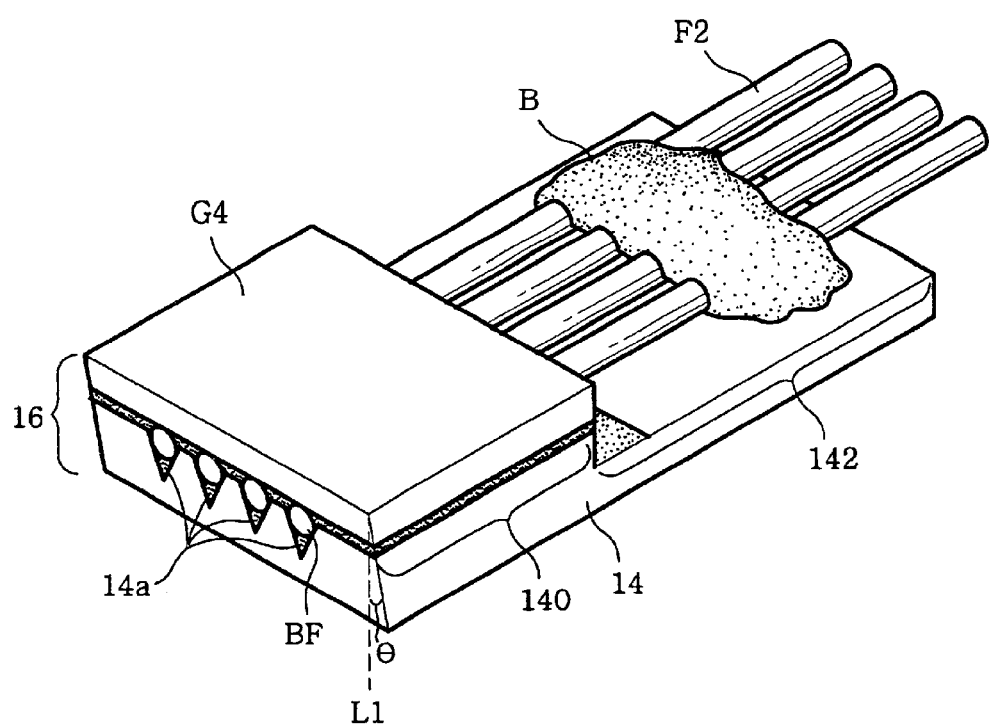
FIG. 2 is a perspective view of the conventional output optical fiber block that fixes optical fibers using a cover.
Figure 3:
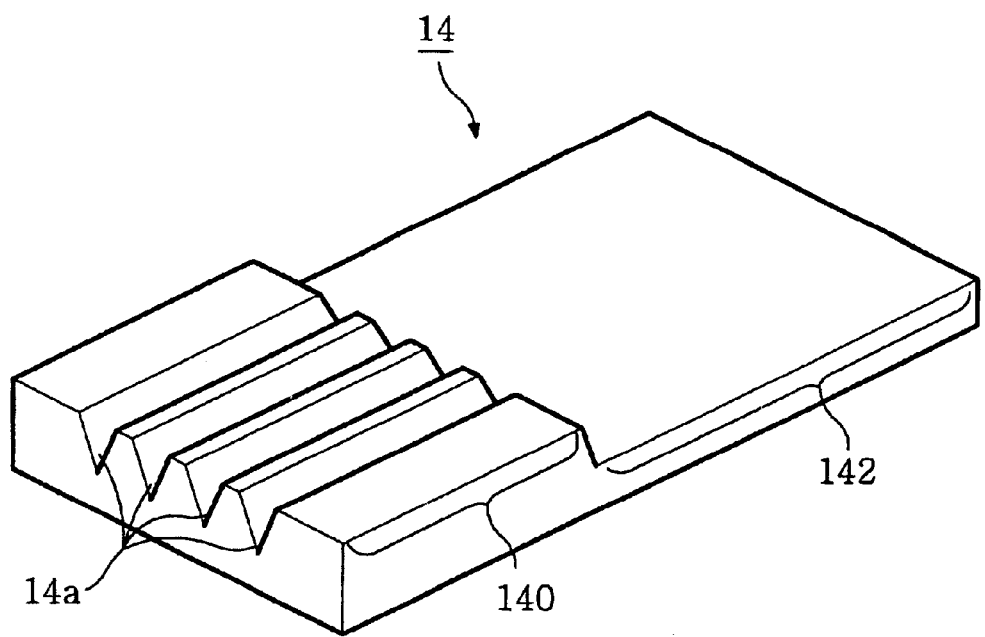
FIG. 3 is a perspective view of the optical fiber block shown in FIG. 2.
Figure 4:
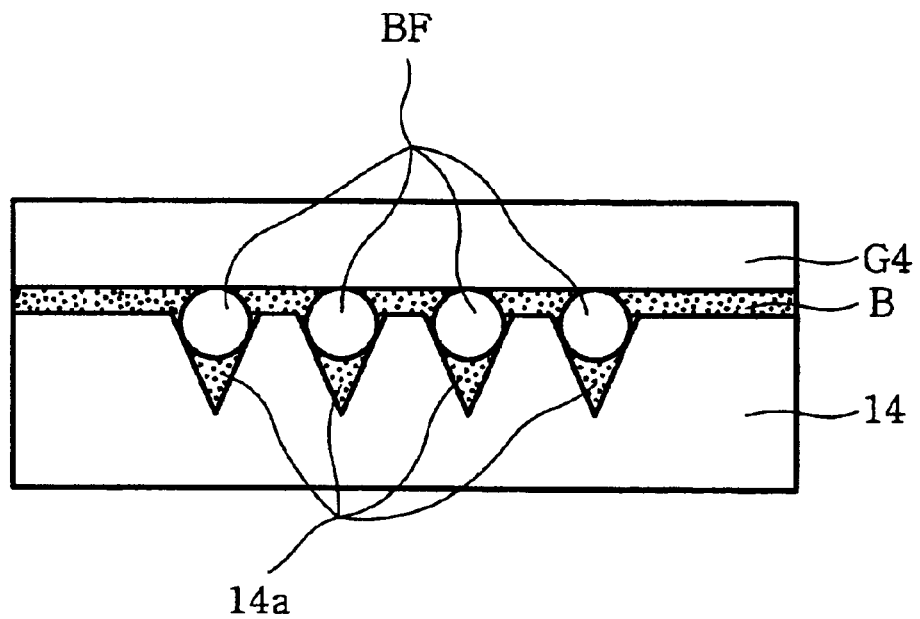
FIG. 4 is a frontal view of the conventional output optical fiber block with the optical fibers shown in FIG. 2.
Figure 5:
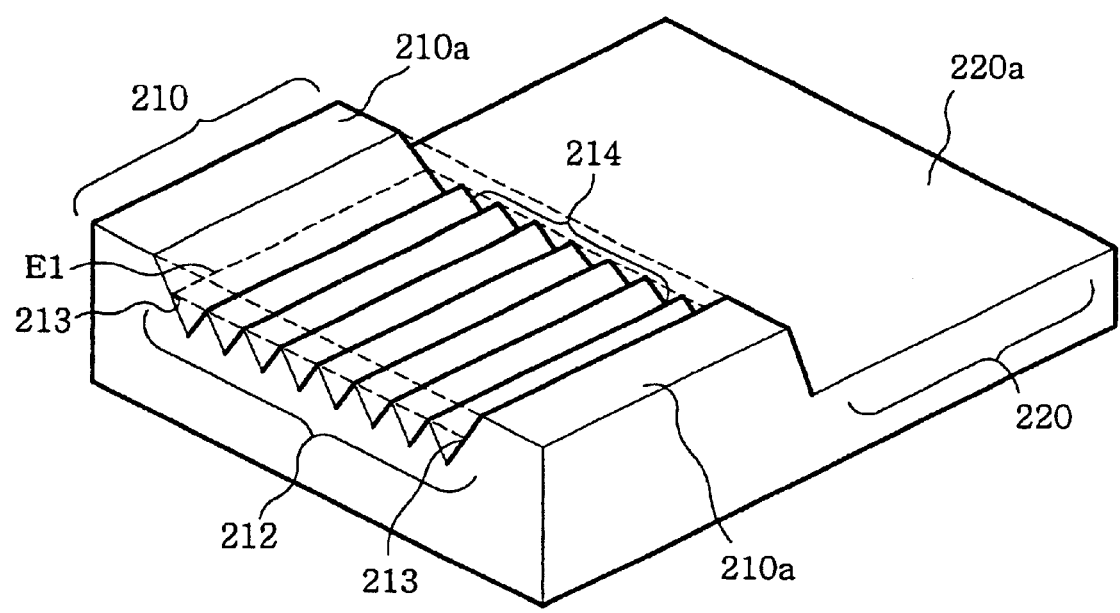
FIG. 5 is a perspective view of an optical fiber block according to a preferred embodiment of the present invention.

FIG. 5 illustrates an optical fiber block 20 in which the optical fibers of a ribbon fiber are to be aligned according to a preferred embodiment of the present invention. As shown in FIG. 5, the optical fiber block 20 includes an optical-fiber-alignment portion 210 in which bare optical fibers of the ribbon fiber are aligned, and a stress-reduction-depth portion 220 that is etched to a predetermined depth. An array of V grooves 212 having first V grooves 213 and second V grooves 214 is formed along the optical-fiber-alignment portion 210. The stress-reduction-depth portion 220 has a planar surface 220a on which the portion of the bare optical fibers and the coated optical fibers are fixed. Here, the bare optical fibers represent optical fibers of the ribbon fiber from which the coatings are removed.

The optical-fiber-alignment portion 210 and the stress-reduction-depth portion 220 are formed on a silicon wafer by performing the wet-etching operation twice. The optical fiber block 20 shown in FIG. 5 is designed for an 8-core optical fiber. For the V groove array 212, both ends of the first V grooves 213 are formed larger than the second V grooves 214 disposed in the middle thereof.

Figure 6A:
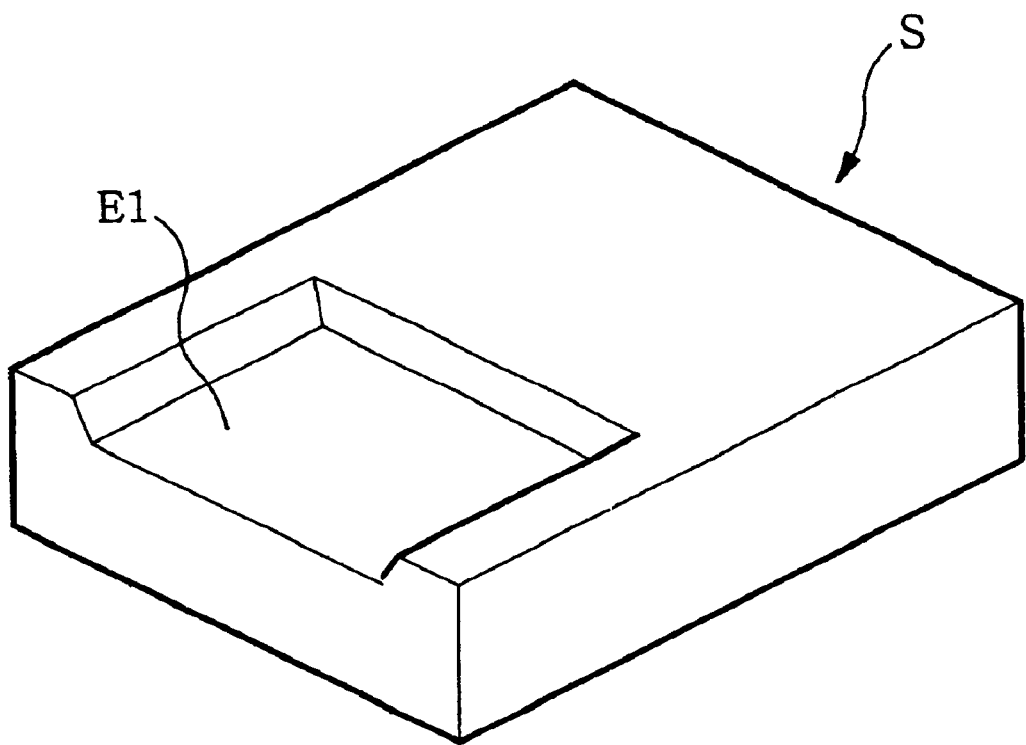
FIGS. 6A and 6B are perspective views sequentially illustrating an optical fiber block fabrication process according to the preferred embodiment of the present invention.
Figure 6B:
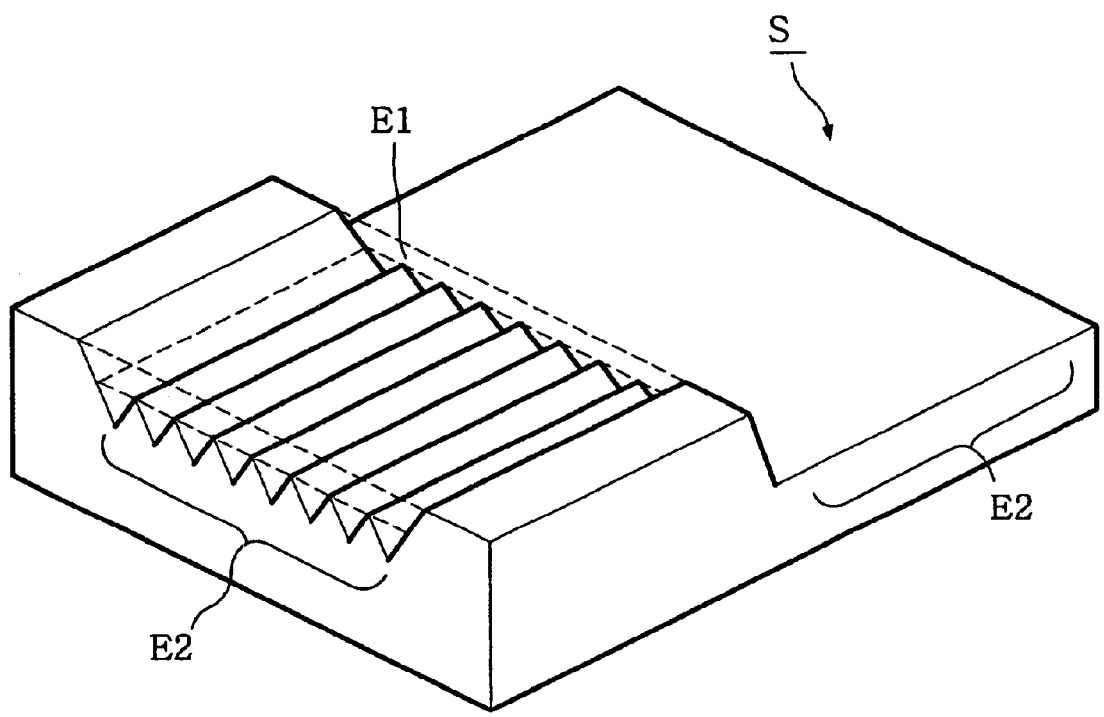

FIGS. 6A and 6B illustrate the process of forming the V grooves on the optical fiber block 20 through a double wet-etching process in accordance with the techniques of the present invention. Referring to the drawings, a first etched portion E1 and a second etched portion E2 are formed on a silicon wafer S through the primary and secondary etch processes, respectively. In particular, the first and second etched portions E1 and E2 are defined by a photo-mask (not shown). The primary etching produces a planar first etched portion E1 with a first predetermined depth on the silicon wafer S. The secondary etching produces a second etched portion E2 containing the array of the V groves, with a second predetermined depth from the first etched portion E1. The second etched portion E2 defines the stress-reduction-depth portion.

Referring back to FIG. 5, the first V grooves 213 and the second V grooves 214 are formed through the wet-etching process. The outer ends of the first V groves 213 are etched deeper than the second V grooves 214. Therefore, when optical fibers are placed in the V grooves 213 and 214, they are fully accommodated under the upper surface 210a of the optical fiber block 20.

Figure 7:
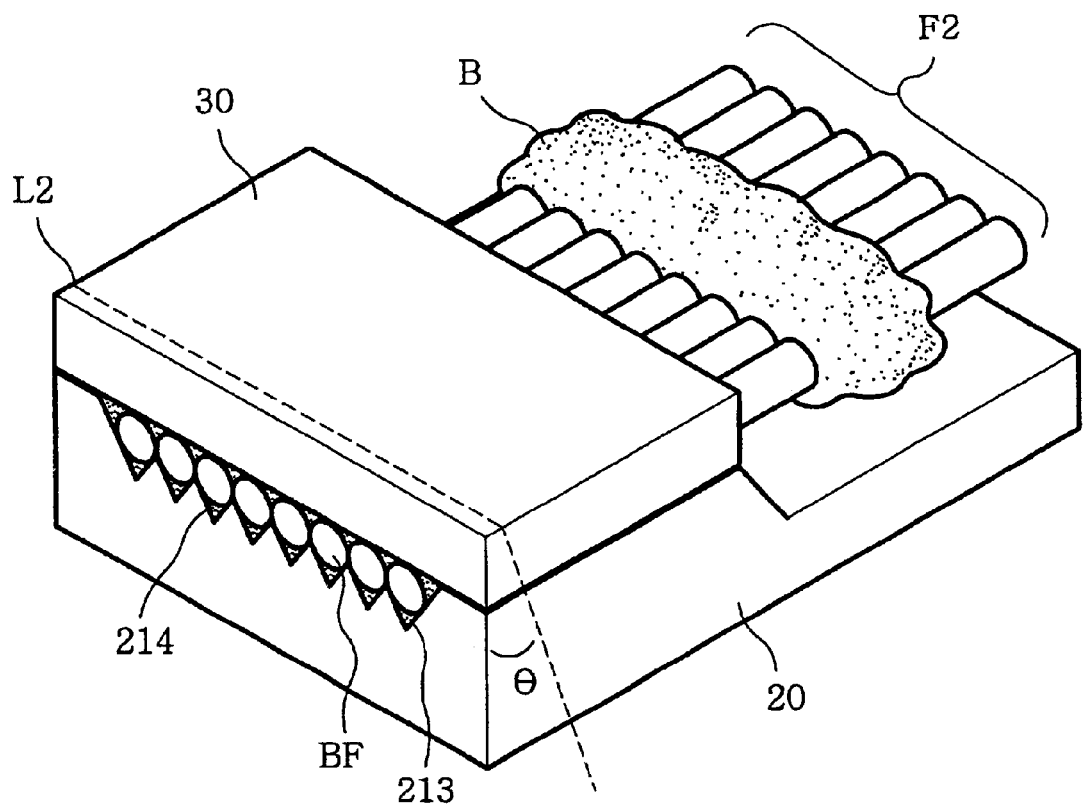
FIG. 7 is a perspective view of the optical fiber block that fixes a ribbon fiber according to the preferred embodiment of the present invention; and, FIG. 8 is a frontal view of the optical fiber block with the ribbon fiber fixed according to the preferred embodiment of the present invention.
Figure 8:
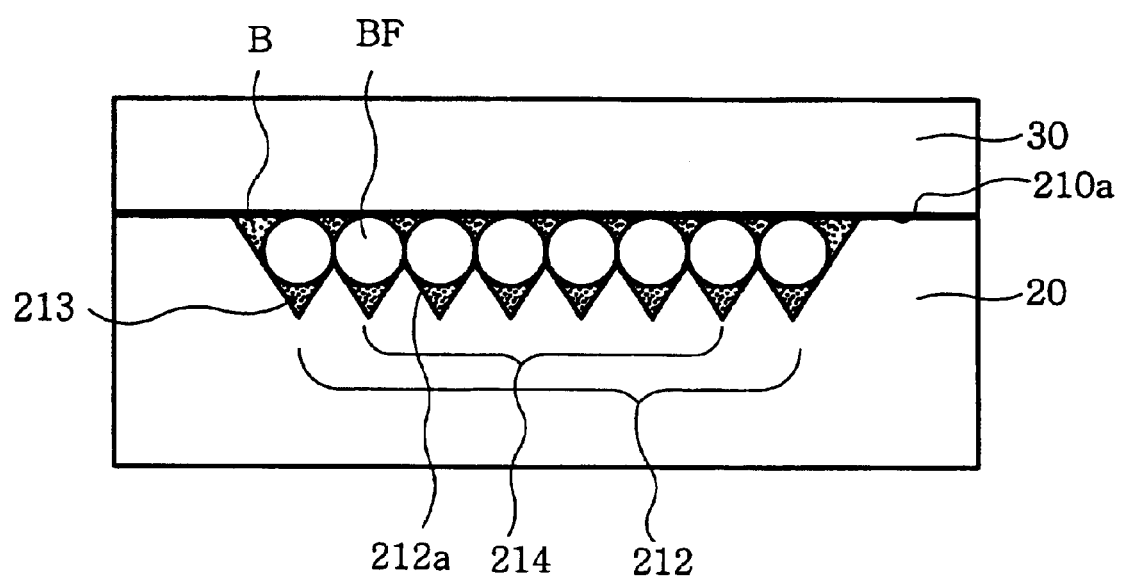

Referring to FIGS. 7 and 8, the bare optical fibers aligned in the V grooves 213 and 214 are fixed using a glass cover and an epoxy resin. As the one end of the first V grooves 213 is larger than the second V grooves 214, bare optical fibers are easily placed. In addition, since the bare optical fibers BF can be accommodated fully in the first and second V grooves 213 and 214, a glass cover 30 is placed as close to the upper surface 210a of the optical fiber block 20 as possible, thereby minimizing the influence of the epoxy B. The optical fiber block 20 and the glass cover 30 are polished along a polishing line L2 inclined at a predetermined length θ. FIG. 8 shows the optical fiber block 20 with the bare optical fibers after polishing.

In accordance with the present invention as described above, as the V grooves accommodate the bare optical fibers fully, the space between an optical fiber block and a glass cover is minimized when they are combined. This implies that a minimum amount of epoxy is used. Therefore, the influence of the epoxy is minimized, and the reliability of the device is improved. Furthermore, the ends of the outer V grooves are larger than the middle V grooves, thus facilitating alignment of the bare optical fibers in the optical fiber block.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. An optical fiber block for aligning an optical waveguide device, comprising: an optical-fiber-alignment portion having an array of V grooves for accommodating non-coated optical fibers of a ribbon fiber, said array of V grooves including first V grooves disposed at both ends of said array of V grooves and an array of second V grooves that is different from said first V grooves disposed between said first V grooves and in immediate contact with said first V grooves; and, a stress-reduction-depth portion extended to a predetermined depth from said optical-fiber-alignment portion for reducing stress caused by coating materials of said optical fibers.

2. The optical fiber block of claim 1, wherein said second V grooves are etched substantially deeper than said first V grooves so that outer angular surfaces respectively defined by the first V grooves span a depth in said optical fiber alignment portion greater than a depth spanned by the second V grooves.

3. The optical fiber block of claim 1, wherein said array of V grooves includes adequate space to accommodate said non-coated optical fibers of the ribbon fiber.

4. A method for aligning an optical waveguide device, the method comprising the steps of: providing an output optical fiber block for transmitting light therethrough; performing a primary etching on one end of said optical fiber block to a first predetermined depth to form an optical-fiber-alignment portion and a secondary etching on the same end to a second predetermined depth to form an array of V grooves; performing a third etching on the other end of said optical fiber block to a third predetermined depth extending from said optical-fiber-alignment portion to form a stress-reduction-depth portion; aligning each of non-coated optical fibers of a ribbon fiber along said array of V grooves so that said non-coated optical fibers of the ribbon fiber are fully enclosed in said array of V grooves; and, bonding said non-coated optical fibers of the ribbon fiber to said array of V grooves for transmitting a signal light to one end of said optical waveguide device.

* * * * *